US008874895B2

(12) United States Patent
Nagara

(10) Patent No.: US 8,874,895 B2
(45) Date of Patent: *Oct. 28, 2014

(54) DATA TRANSMITTING APPARATUS, DATA RECEIVING APPARATUS, DATA TRANSMITTING METHOD, AND DATA RECEIVING METHOD

(75) Inventor: Toru Nagara, Tokyo (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/495,669

(22) Filed: Jun. 13, 2012

(65) Prior Publication Data

US 2012/0257754 A1 Oct. 11, 2012

Related U.S. Application Data

(63) Continuation of application No. 12/459,867, filed on Jul. 9, 2009, now Pat. No. 8,316,241.

(30) Foreign Application Priority Data

Jul. 11, 2008 (JP) ................ P2008-181728

(51) Int. Cl.
| H04L 29/06 | (2006.01) |
| H04N 21/4363 | (2011.01) |
| H04N 21/4385 | (2011.01) |
| H04N 21/4367 | (2011.01) |
| H04L 9/32 | (2006.01) |
| G09G 5/00 | (2006.01) |

(52) U.S. Cl.
CPC ........ *H04N 21/4367* (2013.01); *H04L 2209/60* (2013.01); *G09G 2370/12* (2013.01); *H04N 21/43637* (2013.01); *G09G 2370/16* (2013.01); *H04N 21/43853* (2013.01); *H04N 21/43632* (2013.01); *H04L 9/3273* (2013.01); *G09G 5/006* (2013.01); *H04L 2209/80* (2013.01)
USPC ............ 713/150; 380/229; 380/232; 380/270

(58) Field of Classification Search
USPC .......................................... 380/270; 713/150
See application file for complete search history.

(56) References Cited

U.S. PATENT DOCUMENTS 7,242,766 B1 7/2007 Lyle
7,530,098 B2 * 5/2009 Anderson ................ 726/7
(Continued)

FOREIGN PATENT DOCUMENTS

JP 2003-037591 A 2/2003
JP 2004072317 A 3/2004
(Continued)

OTHER PUBLICATIONS

Gilbert et al., "A 4-Gbps Uncompressed Wireless HD A/V Transceiver Chipset", 2008 IEEE, pp. 56-64.*

(Continued)

*Primary Examiner* — Mohammad L Rahman
(74) *Attorney, Agent, or Firm* — Lerner, David, Littenberg, Krumholz & Mentlik, LLP

(57) ABSTRACT

The present invention provides a data transmitting apparatus in which a device information obtaining unit obtains device information of a device connected to the data transmitting apparatus; a verification unit verifies validity of a data receiving apparatus, based on the device information obtained by the device information obtaining unit; and a control unit performs control as to whether to obtain the device information through a wireless communication unit or obtain the device information through a wire communication unit, and as to whether to transmit image information encrypted by a first encryption unit from the wireless communication unit or transmit image information encrypted by a second encryption unit from the wire communication unit when the verification unit verifies that the data receiving apparatus is authorized.

14 Claims, 9 Drawing Sheets

(56) References Cited

U.S. PATENT DOCUMENTS

| | | | |
|---|---|---|---|
| 8,019,999 B2 * | 9/2011 | Candelore | 713/175 |
| 8,279,784 B2 * | 10/2012 | Chiang et al. | 370/289 |
| 2001/0037307 A1 | 11/2001 | Kori et al. | |
| 2003/0219033 A1 | 11/2003 | Silvester | |
| 2006/0265735 A1 * | 11/2006 | Ohno | 726/2 |
| 2007/0192500 A1 | 8/2007 | Lum | |
| 2007/0287421 A1 | 12/2007 | Kirke | |
| 2008/0127312 A1 | 5/2008 | Iwamoto et al. | |
| 2009/0296938 A1 | 12/2009 | Devanand et al. | |
| 2011/0219397 A1 | 9/2011 | Drope | |

FOREIGN PATENT DOCUMENTS

| | | | |
|---|---|---|---|
| JP | 2006-128963 A | 5/2006 | |
| JP | 2006323707 A | 11/2006 | |
| JP | 2009130874 A | 6/2009 | |

OTHER PUBLICATIONS

Lee et al., "HDCP Technology & Compliance Program Overview", 2009 Allion Test Labs.*

Office Action from Japanese Application No. 2008-181728, dated Apr. 20, 2010.

Jeffrey M. Gilbert et al., a4-Gbps Uncompressed Wireless HD A/V Transceiver Chipset, IEEE Micro, Mar./Apr. 2008, vol. 28, No. 2 pp. 56-64.

* cited by examiner

US 8,874,895 B2

DATA TRANSMITTING APPARATUS, DATA RECEIVING APPARATUS, DATA TRANSMITTING METHOD, AND DATA RECEIVING METHOD

CROSS-REFERENCE TO RELATED APPLICATION

The present application is a continuation of U.S. application Ser. No. 12/459,867, filed on Jul. 9, 2009, which claims priority from Japanese Patent Application JP 2008-181728, filed in the Japanese Patent Office on Jul. 11, 2008, the entire disclosures of which are incorporated herein by reference.

BACKGROUND OF THE INVENTION

1. Field of the Invention

The present invention relates to a data transmitting apparatus, a data receiving apparatus, a data transmitting method, and a data receiving method. More particularly, the present invention relates to a data transmitting apparatus, a data receiving apparatus, a data transmitting method, and a data receiving method that verify the validity of a device in wireless communication.

2. Description of the Related Art

In related art, for the purpose of protecting the copyright of music content, video content, etc., various protocols, e.g., HDMI (High-Definition Multimedia Interface), are proposed. For a content protection scheme, for example, HDCP (High-bandwidth Digital Content Protection system) is used. The HDCP standard defines a key sharing scheme for device authentication or authentication between the transmitting side and the receiving side, an encryption scheme for content to be transmitted, etc.

In authentication based on the HDCP standard, etc., a device key for individually authenticating a communication partner's apparatus by public key encryption is used. When authentication between a transmitting apparatus and a receiving apparatus succeeds, the transmitting apparatus encrypts a video signal using a device key and transmits the encrypted video signal and the receiving apparatus decrypts the received video signal using a device key.

Also, in the HDCP standard, the above-described authentication process is performed and a so-called revocation process for determining whether the receiving apparatus is an unauthorized device is performed. Only after the receiving apparatus is determined by the revocation process not to be an unauthorized device, encryption transmission is enabled.

In the case of a device that wirelessly transmits an image signal, also, when a secure connection is established using HDMI, etc., between a source device, such as a recording and reproducing apparatus, and a wireless device (data transmitting apparatus) and between a wireless device (data receiving apparatus) and a sink device such as a display, the devices can mutually determine whether they are authorized devices, by using security information stored in each device. Consequently, allowance for signal transmission between differing transmitting and receiving devices is enabled.

[Patent Document 1] Japanese Patent Application Laid-Open No. 2003-37591
[Patent Document 2] Japanese Patent Application Laid-Open No. 2006-128963

SUMMARY OF THE INVENTION

However, when, for example, a data receiving apparatus is built in a display, etc., and thus the security information based on HDCP, etc., is not stored on the receiving side, content may not be protected against unauthorized copying unless the data receiving apparatus is always used with a specific data transmitting apparatus as a pair. Accordingly, there is an issue of poor usability.

In wireless communication, image data is transmitted in a manner such that image data compression according to an image signal, etc., are performed by a method using a DCT/Wavelet transform, etc., to reduce transfer rate. Hence, when content data is encrypted based on HDCP, after the content data is decrypted the content data needs to be encrypted again to transmit image data by wireless communication. Accordingly, there is an issue that the process becomes complex.

The present invention has been made in view of the above-described issues and it is desirable to provide novel and improved data transmitting apparatus, data receiving apparatus, data transmitting method, and data receiving method that are capable of performing encryption by wireless communication and verifying the validity of a device.

According to an embodiment of the present invention, there is provided a data transmitting apparatus including: a first encryption unit that encrypts image information of input content with a first encryption scheme; a wireless communication unit that transmits, by wireless communication, the image information encrypted by the first encryption unit; a second encryption unit that encrypts image information of input content with a second encryption scheme; a wire communication unit that transmits, by wire communication, the image information encrypted by the second encryption unit; a device information obtaining unit that obtains device information of a device connected to the data transmitting apparatus; a verification unit that verifies validity of a data receiving apparatus, based on the device information obtained by the device information obtaining unit; and a control unit that performs control as to whether to obtain the device information through the wireless communication unit or obtain the device information through the wire communication unit, and as to whether to transmit the image information encrypted by the first encryption unit from the wireless communication unit or transmit the image information encrypted by the second encryption unit from the wire communication unit when the verification unit verifies that the data receiving apparatus is authorized.

According to the configuration, when the data transmitting apparatus is connected to a data receiving apparatus by wireless communication, device information of the data receiving apparatus is obtained through the wireless communication unit. When the data receiving apparatus is verified to be authorized, image information encrypted by the first encryption unit is transmitted from the wireless communication unit. When the data transmitting apparatus is connected to a data receiving apparatus by wire communication, device information of the data receiving apparatus is obtained through the wire communication unit. When the data receiving apparatus is verified to be authorized, image information encrypted by the second encryption unit is transmitted from the wire communication unit.

Consequently, when image information of content is transmitted in wireless communication, the image information can be encrypted with the first encryption scheme which is normally used for wireless communication. Also, even in wireless communication, the validity of device information can be verified. Even when wireless communication is performed, the validity of a data receiving apparatus can be authenticated using wire-input security information. Thus, even when HDCP security information is not stored on the receiving side, transmission and reception of content data can be performed with any device other than a specific transmitting apparatus, with the copyright of the content data being protected.

When the data transmitting apparatus is connected to the data receiving apparatus by wireless communication, the control unit may control the verification unit to verify the validity of the data receiving apparatus and control the first encryption unit to encrypt the image information. The device information obtaining unit obtains information on unauthorized devices from an external apparatus, and when the device information of the data receiving apparatus is not included in the information on unauthorized devices obtained by the device information obtaining unit, the verification unit may determine that the data receiving apparatus is an authorized device.

The first encryption unit may compress the image information of input content according to the image information and thereafter encrypt the compressed image information with the first encryption scheme. The second encryption unit may encrypt the image information of input content with the second encryption scheme and thereafter TMDS-convert the encrypted image information.

The wire communication unit may transmit the image information of content through a TMDS circuit. The verification unit may verify the data receiving apparatus, based on an HDCP standard.

According to another embodiment of the present invention, there is provided a data receiving apparatus including: a wireless communication unit that receives image information of content by wireless communication from a data transmitting apparatus connected to the data receiving apparatus; a first decryption unit that decrypts the received image information of content with a first decryption scheme; a wire communication unit that receives image information of content from the data transmitting apparatus by wire communication; a second decryption unit that decrypts the received image information of content with a second decryption scheme; a device information obtaining unit that obtains device information of a device connected to the data receiving apparatus; a verification unit that verifies validity of the device, based on the device information obtained by the device information obtaining unit; and a control unit that performs control as to whether to obtain the device information through the wireless communication unit or obtain the device information through the wire communication unit, and as to whether to receive the image information by the wireless communication unit and decrypt the image information by the first decryption unit or receive the image information by the wire communication unit and decrypt the image information by the second decryption unit when the verification unit verifies that the device is authorized.

According to the configuration, when the data receiving apparatus is connected to a data transmitting apparatus by wireless communication, image information of content is received from the data transmitting apparatus through the wireless communication unit and device information of a device connected to the data receiving apparatus is obtained by wireless communication. When the connected device is verified to be authorized, image information encrypted by the first encryption unit is transmitted from the wireless communication unit. When image information of content is received from the data transmitting apparatus by wire communication, device information of a device connected to the data receiving apparatus is obtained through the wire communication unit. When the connected device is verified to be authorized, image information encrypted by the second encryption unit is transmitted from the wire communication unit.

Consequently, when image information of content is transmitted and received in wireless communication, image information of content is received by wireless communication and the received image information can be encrypted with the first encryption scheme which is normally used for wireless communication. Also, even in wireless communication, the validity of device information can be verified. Even when wireless communication is performed, the validity of a connected device can be authenticated using security information provided for a wire input. Thus, even when HDCP security information for wireless is not stored on the receiving side, transmission and reception of content data can be performed with any device other than a specific transmitting apparatus, with the copyright of the content data being protected. For example, when image information of content is transmitted from the data receiving apparatus by wireless communication to a sink device such as a display, the validity of the sink device can be verified using wire-input security information stored in the display, etc.

When the data receiving apparatus is connected to the device by wireless communication, the control unit may control the verification unit to verify the validity of the device and control the first decryption unit to decrypt the image information. The device information obtaining unit may obtain information on unauthorized devices from an external apparatus, and when the device information of the device is not included in the information on unauthorized devices obtained by the device information obtaining unit, the verification unit may determine that the device is an authorized device.

The first decryption unit may compress the image information of content according to the image information and thereafter decrypt the compressed image information with the first decryption scheme. The second decryption unit may decrypt the image information of content with the second decryption scheme and thereafter TMDS-convert the decrypted image information.

The wire communication unit may transmit the image information of content through a TMDS circuit. The verification unit may verify the data receiving apparatus, based on an HDCP standard.

According to another embodiment of the present invention, there is provided a data receiving apparatus including: a wireless communication unit that receives image information of content by wireless communication from a data transmitting apparatus connected to the data receiving apparatus; a first decryption unit that decrypts the received image information of content with a first decryption scheme; a wire communication unit that receives image information of content from the data transmitting apparatus by wire communication; a second decryption unit that decrypts the received image information of content with a second decryption scheme; a device information transmitting unit that transmits device information of the data receiving apparatus; a verification result obtaining unit that obtains a verification result of validity of the data receiving apparatus which is verified by the data transmitting apparatus, based on the device information transmitted from the device information transmitting unit; a control unit that performs control as to whether to transmit the device information through the wireless communication unit or transmit the device information through the wire communication unit, and as to whether to receive the image information by the wireless communication unit and decrypt the image information by the first decryption unit or receive the image information by the wire communication unit and decrypt the image information by the second decryption unit when the verification result obtaining unit obtains a verification result that the data receiving apparatus is authorized; and a display screen generating unit that generates a display screen containing the image information decrypted by the first decryption unit or the second decryption unit.

According to the configuration, when the data receiving apparatus is connected to a data transmitting apparatus by wireless communication, device information of the data receiving apparatus is transmitted by wireless communication. When the validity of the data receiving apparatus is confirmed, image information of content is received from the data transmitting apparatus through the wireless communication unit. Then, the image information of content is decrypted with the first decryption scheme and a display screen containing the decrypted image information is generated. When the data receiving apparatus is connected to a data transmitting apparatus by wire communication, device information of the data receiving apparatus is transmitted by wire communication. When the validity of the data receiving apparatus is confirmed, image information of content is received from the data transmitting apparatus through the wire communication unit. Then, the image information of content is decrypted with the second decryption scheme and a display screen containing the decrypted image information is generated.

Consequently, when image information of content is transmitted and received in wireless communication, image information of content is received by wireless communication and the received image information can be decrypted with the first decryption scheme which is normally used for wireless communication. Even when wireless communication is performed, the validity of a connected device can be authenticated using security information for a wire input. Thus, even when HDCP security information for wireless is not stored on the receiving side, transmission and reception of content data can be performed with any device other than a specific transmitting apparatus, with the copyright of the content data being protected. For example, when a data receiving apparatus and a display apparatus are configured into one unit, the validity of the data receiving apparatus can be verified using wire-input security information stored in the display apparatus, etc.

The display screen generating unit is included in a display apparatus which is built in the data receiving apparatus, the device information transmitting unit transmits device information of the display apparatus, and the verification result obtaining unit may obtain a verification result of validity of the data receiving apparatus which is verified by the data transmitting apparatus, based on the device information of the display apparatus.

The first decryption scheme may be used when image information of content is transmitted by wireless communication. The second decryption scheme may perform HDCP standard-based decryption on image information of content transmitted by wire communication.

The wire communication unit may receive the image information of content through a TMDS circuit. The verification result obtaining unit may obtain a verification result of the validity of the data receiving apparatus which is verified based on an HDCP standard.

According to another embodiment of the present invention, there is provided a data transmitting method including the steps of: encrypting image information of input content with a first encryption scheme; encrypting image information of input content with a second encryption scheme; determining whether to obtain device information of a device connected through a wireless communication unit that receives image information of content by wireless communication or obtain the device information through a wire communication unit that receives image information of content by wire communication, and obtaining the device information of the device; verifying validity of a data receiving apparatus, based on the obtained device information; and when the data receiving apparatus is verified to be authorized, performing control as to whether to transmit the image information encrypted with the first encryption scheme from the wireless communication unit or transmit the image information encrypted with the second encryption scheme from the wire communication unit.

According to another embodiment of the present invention, there is provided a data receiving method including the steps of: decrypting image information of content received from a data transmitting apparatus, with a first decryption scheme; decrypting image information of content received from the data transmitting apparatus, with a second decryption scheme; performing control as to whether to obtain device information of a device connected through a wireless communication unit that receives image information of content by wireless communication or obtain the device information through a wire communication unit that receives image information of content by wire communication; obtaining the device information of the device; verifying validity of the device, based on the obtained device information; and when the device is verified to be authorized, performing control as to whether to receive the image information by the wireless communication unit and decrypt the image information with the first decryption scheme or receive the image information by the wire communication unit and decrypt the image information with the second decryption scheme.

According to another embodiment of the present invention, there is provided a data receiving method including the steps of: decrypting image information of content received from a data transmitting apparatus, with a first decryption scheme; decrypting image information of content received from the data transmitting apparatus, with a second decryption scheme; performing control as to whether to transmit device information of a data receiving apparatus through a wireless communication unit that receives image information of content by wireless communication or transmit the device information through a wire communication unit that receives image information of content by wire communication; transmitting the device information; obtaining a verification result of validity of the data receiving apparatus which is verified by the data transmitting apparatus, based on the transmitted device information; when a verification result that the data receiving apparatus is authorized is obtained, performing control as to whether to receive the image information by the wireless communication unit and decrypt the image information with the first decryption scheme or receive the image information by the wire communication unit and decrypt the image information with the second decryption scheme; and generating a display screen containing the image information decrypted with the first decryption scheme or the second decryption scheme.

According to the embodiments of the present invention described above, encryption by wireless communication can be performed and the validity of a device can be verified.

DETAILED DESCRIPTION OF THE PREFERRED EMBODIMENTS

Figure 1:
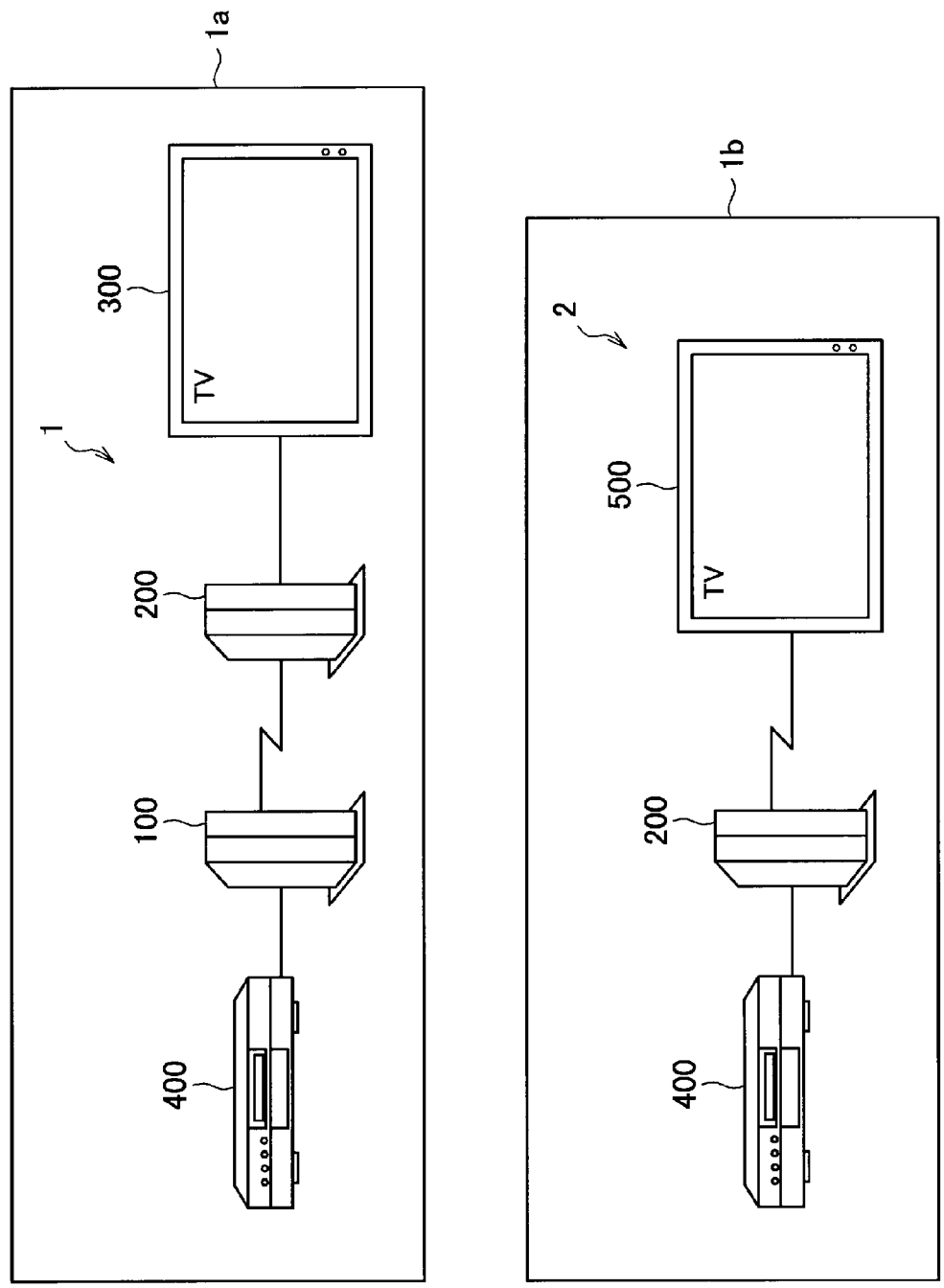
FIGS. 1a and 1b are illustrative diagrams describing a summary of data transmitting and receiving systems according to embodiments of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First, a summary of data transmitting and receiving systems according to embodiments of the present invention will be described. FIGS. 1a and 1b are illustrative diagrams showing exemplary configurations of data transmitting and receiving systems 1 and 2 according to the embodiments of the present invention. As shown in FIG. 1a, the data transmitting and receiving system 1 includes a source device 400 such as a recording and reproducing apparatus, a data transmitting apparatus 100, a data receiving apparatus 200, and a sink device 300 such as a display. As shown in FIG. 1b, the data transmitting and receiving system 2 includes a source device 400 such as a recording and reproducing apparatus, a data receiving apparatus 200, and a sink device 500 such as a display (which also performs data reception).

The source device 400 is an apparatus that records and reproduces content of a television program, a movie, etc. The source device 400 has a function of outputting content data from an output apparatus of the source device 400, using a content protection scheme based on HDCP (High-bandwidth Digital Content Protection system), etc. Here, the source device 400 and the data transmitting apparatus 100 comply with an interface standard, e.g., HDMI (High-Definition Multimedia Interface), and transmit content data using a transmission scheme such as TMDS (Transition Minimized Differential Signaling).

In the data transmitting and receiving system 1, the data transmitting apparatus 100 is connected to the data receiving apparatus 200 by wireless communication and encrypted content data is transmitted from the data transmitting apparatus 100 to the data receiving apparatus 200. Then, the content data received by the data receiving apparatus 200 is displayed on the sink device 300, such as a display of a television set, connected by wire to the data receiving apparatus 200.

In the data transmitting and receiving system 2, also, likewise, content data is output from the source device 400 through the data receiving apparatus 200. The data receiving apparatus 200 and the sink device 500 which also performs data reception are connected to each other by wireless communication. Encrypted content data is transmitted from the data receiving apparatus 200 and is received by the sink device 500 and is then displayed on a display, etc., in the sink device 500.

As described above, the source device 400 and the data receiving apparatus 200 perform transmission of content data, using a content protection scheme based on HDCP, etc. The HDCP standard defines a key sharing scheme for device authentication or authentication between the transmitting side and the receiving side, an encryption scheme for content to be transmitted, etc. In authentication based on the HDCP standard, a device key for individually authenticating a communication partner's apparatus by public key encryption is used. When authentication between a transmitting apparatus and a receiving apparatus succeeds, the transmitting apparatus encrypts a video signal using a device key and transmits the encrypted video signal and the receiving apparatus decrypts the received video signal using a device key.

Furthermore, in the HDCP standard, the above-described authentication process is performed and a so-called revocation process for determining whether the receiving apparatus is an unauthorized device is performed. Only after the receiving apparatus is determined by the revocation process not to be an unauthorized device, encryption transmission is enabled.

In FIG. 1a, when a secure connection is established using HDMI, etc., not only between the source device 400 and the data transmitting apparatus 100 but also between the data receiving apparatus 200 and the sink device 300, the devices can mutually determine whether they are authorized devices, by using security information stored in each device. Consequently, allowance for signal transmission between differing transmitting and receiving devices is enabled.

However, when, as shown in FIG. 1b, a data receiving apparatus is built in a display, etc., and thus security information based on HDCP, etc., stored in the sink device 500 may not be used, unauthorized copying may not be prevented unless the sink device 500 is used with a specific data transmitting apparatus as a pair, resulting in poor usability. In wireless communication, image data is transmitted in a manner such that image data compression according to an image signal, etc., are performed by a DCT/Wavelet transform, etc., to reduce transfer rate. Hence, when content data is encrypted based on HDCP, after the content data is decrypted the content data needs to be encrypted again to transmit image data by wireless communication.

Normally, the sink device 500 such as a display is provided with a wire input in addition to a wireless input. Thus, in the present embodiment, by using wire-input security information, the data receiving apparatus 200 and the sink device 500 are authenticated to be authorized devices. By using wire-input security information, an HDCP revocation process can be performed even in wireless communication. Consequently, even in wireless communication, the validity of a device can be verified based on HDCP, and thus, even when HDCP security information is not stored on the receiving side, transmission and reception of content data can be performed with any device other than a specific transmitting apparatus, with the copyright of the content data being protected.

This is all about a summary of the data transmitting and receiving systems 1 and 2. First, the data transmitting and receiving system 2 will be described. First, the functional configuration of the data transmitting and receiving system 2 will be described with reference to FIG. 2.

Figure 2:
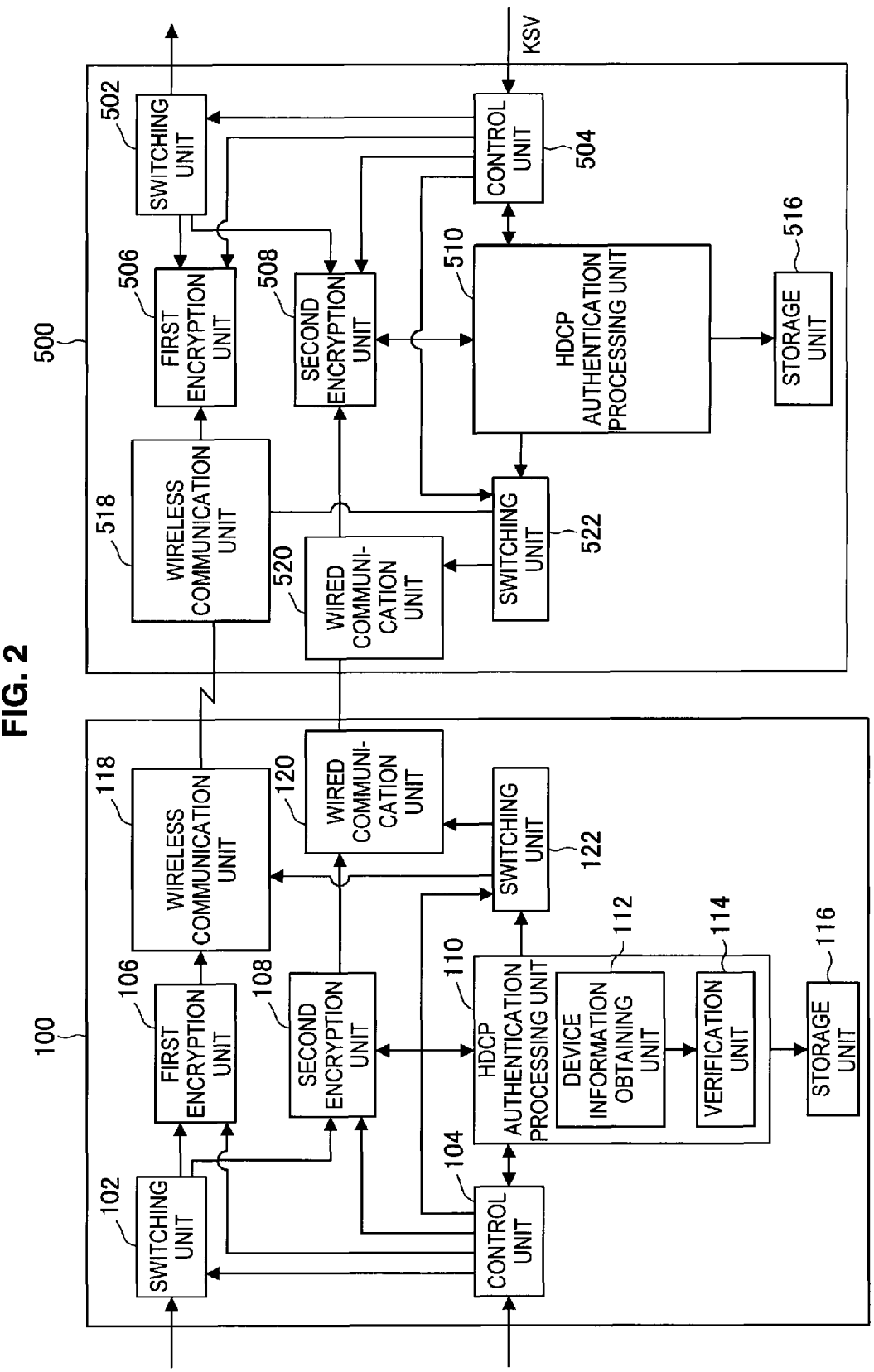
FIG. 2 is a block diagram showing the functional configurations of a data transmitting apparatus and a sink device according to a first embodiment of the present invention.

FIG. 2 is a block diagram showing the functional configurations of the data transmitting apparatus 100 and a data receiving portion of the sink device 500 which also performs data reception. In the present embodiment, the data transmitting apparatus 100 and the sink device 500 can be connected to each other by wireless communication or wire communication. Image information of content is input to the data transmitting apparatus 100. The image information is input to the sink device 500.

As shown in FIG. 2, the data transmitting apparatus 100 includes a switching unit 102, a control unit 104, a first encryption unit 106, a second encryption unit 108, an HDCP authentication processing unit 110, a device information obtaining unit 112, a verification unit 114, a storage unit 116, a wireless communication unit 118, a wire communication unit 120, and a switching unit 122. The sink device 500 includes a switching unit 502, a control unit 504, a first encryption unit 506, a second encryption unit 508, an HDCP authentication processing unit 510, a device information obtaining unit 512, a verification unit 514, a storage unit 516, a wireless communication unit 518, a wire communication unit 520, and a switching unit 522.

Figure 3:
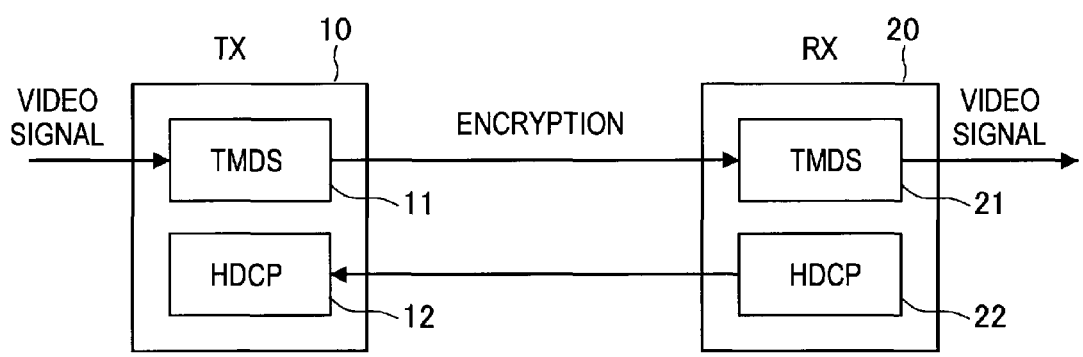
FIG. 3 is an illustrative diagram describing an authentication process and a revocation process based on an HDCP standard, according to the first embodiment.

Before describing in detail the functional configurations of the data transmitting apparatus 100 and the sink device 500, an authentication process and a revocation process based on the HDCP standard will be described with reference to FIG. 3. As shown in FIG. 3, a TX 10 which is an apparatus that transmits content data and an RX 20 which is an apparatus that receives the content data are HDMI-connected to each other. In a normal HDMI connection, there are a TMDS signal path used to transmit an image signal and a DDC signal path used to transmit HDCP authentication information, etc.

The HDMI-connected TX 10 and RX 20 perform an authentication process based on the HDCP standard, etc. Specifically, the HDCP standard implements protection of the copyright of content data by performing the following processes (1) to (3):

(1) Authentication and sharing of a shared key between the TX 10 and the RX 20

(2) Encryption/decryption of content data with the shared key (3) Revocation process using a KSV In (1), the TX 10 and the RX 20 mutually perform authentication using a secret key provided in advance to the TX 10 and the RX 20, and a shared key required to encrypt data is shared between the TX 10 and the RX 20. The shared key is shared only between those devices that are directly connected to each other in the course of an authentication process based on the HDCP standard.

In (2), the TX 10 encrypts data using the shared key shared in the process (1) and transmits the encrypted data based on TMDS 11, and the RX 20 decrypts the data using the shared key.

In (3), a so-called revocation process is performed for determining whether the RX 20 is an unauthorized device, by using a KSV (Key Selection Vector) which is uniquely set according to a secret key of each device in HDCP. Specifically, the RX 20 transmits its KSV to the TX 10 and the TX 10 obtains a KSV list of unauthorized devices from a source device, etc. The TX 10 then verifies whether the KSV of the RX 20 is included in the obtained KSV list. If the KSV of the RX 20 is included in the KSV list, then the RX 20 is considered to be a device that has performed an unauthorized operation and thus the content data is not transmitted to the RX 20.

Accordingly, transmission of content data based on the TMDS 11 from the TX 10 to the RX 20 shown in FIG. 3 is performed after an authentication process including a revocation process based on HDCP succeeds. Consequently, content data can be prevented from being transmitted to an unauthorized device, enabling to protect the copyright of the content data. This is all about an authentication process and a revocation process based on the HDCP standard.

Figure 4:
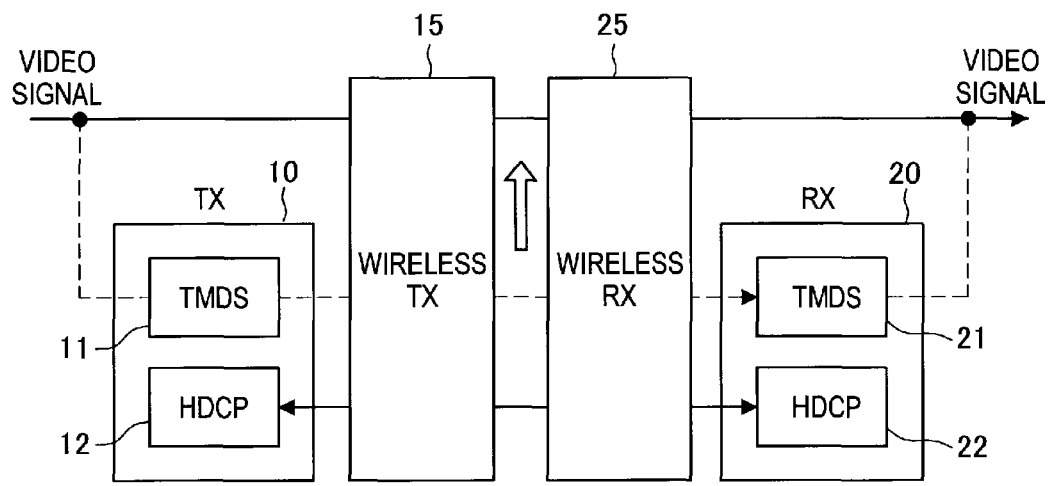
FIG. 4 is an illustrative diagram describing the case in which content data is transmitted and received by wireless communication, according to the first embodiment.

Next, the case in which content data is transmitted and received by wireless communication will be described with reference to FIG. 4. When content data is transmitted and received by wireless communication, transmission and reception of content data are performed through a wireless TX 15 that transmits data by wireless communication and a wireless RX 25 that receives the data by wireless communication. Normally, modulation at an encryption strength equal to that used for a TMDS signal is performed between the wireless TX 15 and the wireless RX 25. When image information, etc., are transmitted by wireless communication, image information, etc., are transmitted in a manner such that image data compression according to an image signal, etc., are performed by a method using a DCT/Wavelet transform, etc., to reduce transfer rate. Hence, when content data is encrypted based on HDCP, after the content data is decrypted the content data needs to be encrypted again to transmit image data by wireless communication. Accordingly, the process becomes complex.

Meanwhile, in the HDCP standard, when an encryption strength equal to that for the TMDS signal path is ensured, transmission through the TMDS signal path does not need to be performed. Hence, when content data is transmitted and received by wireless communication, by performing data transmission and reception by the wireless TX 15 and the wireless RX 25 without performing data transmission and reception based on TMDS 11 and TMDS 21, the above-described complex encryption/decryption processes do not need to be performed.

However, even if an encryption strength equal to that for the TMDS signal path is ensured by wireless communication, unless the above-described HDCP revocation process is performed, content may not be protected. When a revocation process is not performed, even when the wireless RX 25 is an unauthorized device which is not allowed to receive content data, content data is transmitted to the wireless RX 25. In view of this, as for whether the device is unauthorized, by using an HDCP revocation process, content can be protected even in wireless communication.

For example, when the wireless RX 25 is built in a display, etc., and thus security information based on HDCP, etc., is not stored in the wireless RX 25, the revocation process may not be performed and accordingly content may not be protected against unauthorized copying unless the wireless RX 25 is always used with the specific wireless TX 15 as a pair. However, by performing a revocation process using security information stored in the display, etc., encryption by wireless communication can be used and a revocation process can be performed. Consequently, even in wireless communication, mutual authentication between devices can be performed and a transmitting device and a receiving device can be arbitrarily combined. This is all about the case in which content data is transmitted and received by wireless communication.

Returning to FIG. 2, the first encryption unit 106 has a function of encrypting image information of input content with a first encryption scheme. The first encryption scheme is used when content data (image information) is transmitted by wireless communication, and is ensured with an encryption strength equal to that for the above-described TMDS. Alternatively, the first encryption unit 106 may compress image information of input content according to the image information and thereafter encrypt the compressed image information with the first encryption scheme. For compression of image information, a method using, for example, a DCT/Wavelet transform (time-frequency component transform) can be used.

The second encryption unit 108 has a function of encrypting image information of input content with a second encryption scheme. The second encryption scheme performs encryption based on the HDCP standard, specifically, encryption using a shared key which is shared only between those devices that are directly connected to each other in the course of an authentication process. Also, the second encryption unit 108 may TMDS-convert the encrypted image information of content. Furthermore, the second encryption unit 108 may perform a process in synchronization with an authentication process by the HDCP authentication processing unit 110. Specifically, after authentication by the HDCP authentication processing unit 110 succeeds, encryption with the second encryption scheme is performed.

The wireless communication unit 118 is a communication interface such as a wireless LAN (Local Area Network) compatible communication apparatus or a wireless USB compatible communication apparatus. The wireless communication unit 118 has a function of transmitting, by wireless communication, image information encrypted by the first encryption unit 106.

The wire communication unit 120 is a communication interface such as a wire communication apparatus which performs communication by wire. An example of the wire communication unit 120 includes a wire connection unit that complies with the HDMI standard. The wire communication unit 120 has a function of transmitting, by wire communication, image information encrypted by the second encryption unit 108.

The HDCP authentication processing unit 110 performs the above-described device authentication based on the HDCP standard. The HDCP authentication processing unit 110 includes the device information obtaining unit 112 and the verification unit 114. The device information obtaining unit 112 has a function of obtaining device information of a device connected to the data transmitting apparatus 100. The device information is, as described above, a KSV which is uniquely set according to a secret key of each device. KSVs are obtained from the sink device 500 to which image information is to be transmitted and a device connected further thereedown.

The source device 400 has a function of verifying the validity of the sink device 500 and a device connected further thereedown, based on device information obtained by the data transmitting apparatus 100. Specifically, the source device 400 verifies the validity of the sink device 500, etc., based on whether the KSVs of the sink device 500, etc., are included in the above-described KSV list of unauthorized devices. Based on results of the verification, the source device 400 determines whether to perform output.

The control unit 104 has a function of performing control as to whether to transmit and receive data using the wireless communication unit 118 or transmit and receive data using the wire communication unit 120, by controlling switching of the switching unit 102 or the switching unit 122. Specifically, when wireless communication is performed with the sink device 500 by switching the switching unit 122, device information to be obtained by the device information obtaining unit 112 is obtained through the wireless communication unit 118. When wire communication is performed with the sink device 500, the switching unit 122 is switched to obtain the device information through the wire communication unit 120.

When the verification unit 114 verifies that the sink device 500 is an authorized device, the switching unit 122 is switched to transmit encrypted image information to the sink device 500 through the wireless communication unit 118 or the wire communication unit 120. When wireless communication is performed with the sink device 500 by controlling the switching of the switching unit 102, image information may be encrypted by the first encryption unit 106. When wire communication is performed with the sink device 500, image information may be encrypted by the second encryption unit 108.

Examples of the storage unit 116 include nonvolatile memories such as an EEPROM (Electrically Erasable Programmable Read-Only Memory) and an EPROM (Erasable Programmable Read-Only Memory). The storage unit 116 can store a KSV of the sink device 500, a KSV list of unauthorized devices, etc., obtained by the HDCP authentication processing unit 110.

This is all about the functional configuration of the data transmitting apparatus 100. Next, the functional configuration of the sink device 500 will be described. The wireless communication unit 518 is a communication interface such as a wireless LAN compatible communication apparatus or a wireless USB compatible communication apparatus. The wireless communication unit 518 has a function of receiving image information of content transmitted from the data transmitting apparatus 100 by wireless communication.

The wire communication unit 520 is a communication interface such as a wire communication apparatus which performs communication by wire. An example of the wire communication unit 520 includes a wire connection unit that complies with the HDMI standard. The wire communication unit 520 has a function of receiving image information of content transmitted from the data transmitting apparatus 100 by wire communication.

The first encryption unit 506 has a function of encrypting image information of content received by the wireless communication unit 518, with a first encryption scheme. The first encryption scheme is used when content data (image information) is transmitted by wireless communication, and is ensured with an encryption strength equal to that for the above-described TMDS. Alternatively, the first encryption unit 506 may compress image information of input content according to the image information and thereafter encrypt the compressed image information with the first encryption scheme. For compression of image information, for example, a DCT/Wavelet transform (time-frequency component transform) can be used.

The second encryption unit 508 has a function of encrypting image information of content received by the wire communication unit 520, with a second encryption scheme. The second encryption scheme performs encryption based on the HDCP standard, specifically, encryption using a shared key which is shared only between those devices that are directly connected to each other in the course of an authentication process. Also, the second encryption unit 508 may TMDS-convert the encrypted image information of content. Furthermore, the second encryption unit 508 may perform a process in synchronization with an authentication process by the HDCP authentication processing unit 510. Specifically, after authentication by the HDCP authentication processing unit 510 succeeds, encryption with the second encryption scheme is performed.

The HDCP authentication processing unit 510 performs the above-described device authentication and revocation process based on the HDCP standard, etc. The HDCP authentication processing unit 510 has a function of obtaining device information of a device connected to the sink device 500. The device information is, as described above, a KSV which is uniquely set according to a secret key of each device. KSVs are information obtained from a sink device to which image information is to be transmitted, etc.

The control unit 504 has a function of performing control as to whether to transmit and receive data using the wireless communication unit 518 or transmit and receive data using the wire communication unit 520, by controlling switching of the switching unit 502 or the switching unit 522. Specifically, when wireless communication is performed with the data transmitting apparatus 100 by switching the switching unit 522, device information to be obtained by the device information obtaining unit 512 is obtained through the wireless communication unit 518. When wire communication is performed with the data transmitting apparatus 100, the switching unit 522 is switched to obtain the device information through the wire communication unit 520.

Figure 5:
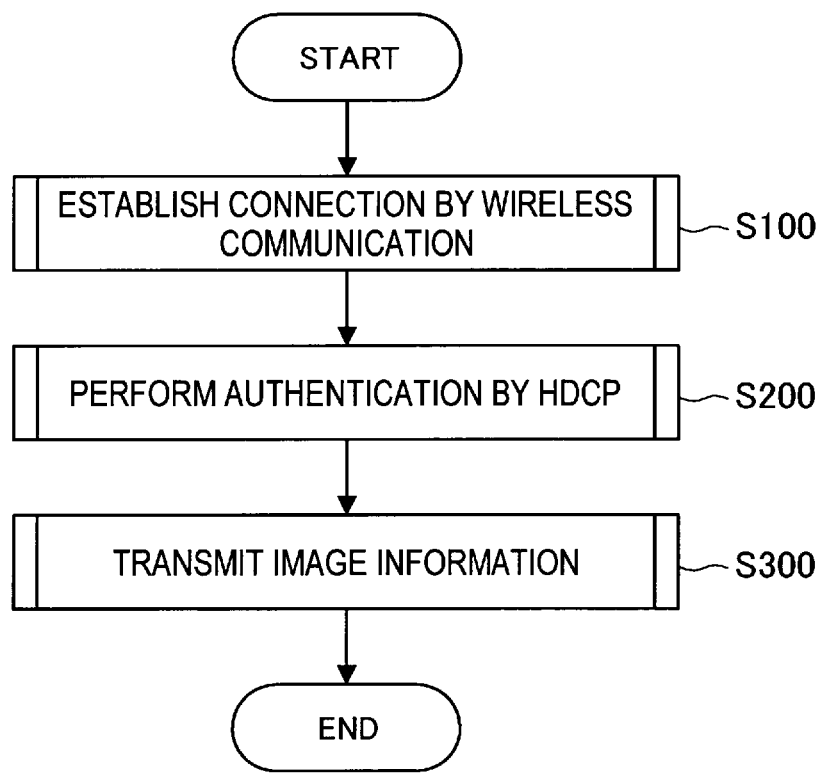
FIG. 5 is a flowchart showing data transmitting and receiving methods according to the first embodiment.

Next, data transmitting and receiving methods for the data transmitting and receiving system 2 will be described with reference to FIGS. 5 to 8. FIG. 5 is a flowchart showing data transmitting and receiving methods for the data transmitting and receiving system 2. As shown in FIG. 5, in the data transmitting and receiving methods for the data transmitting and receiving system 2, a connection process by wireless communication (S100) is performed and thereafter an HDCP authentication process (S200) is performed. After the HDCP authentication process (S200) is performed, an image information transmission process (S300) is performed. Next, each of the connection process by wireless communication (S100), the HDCP authentication process (S200), and the image information transmission process (S300) will be described in detail.

Figure 6:
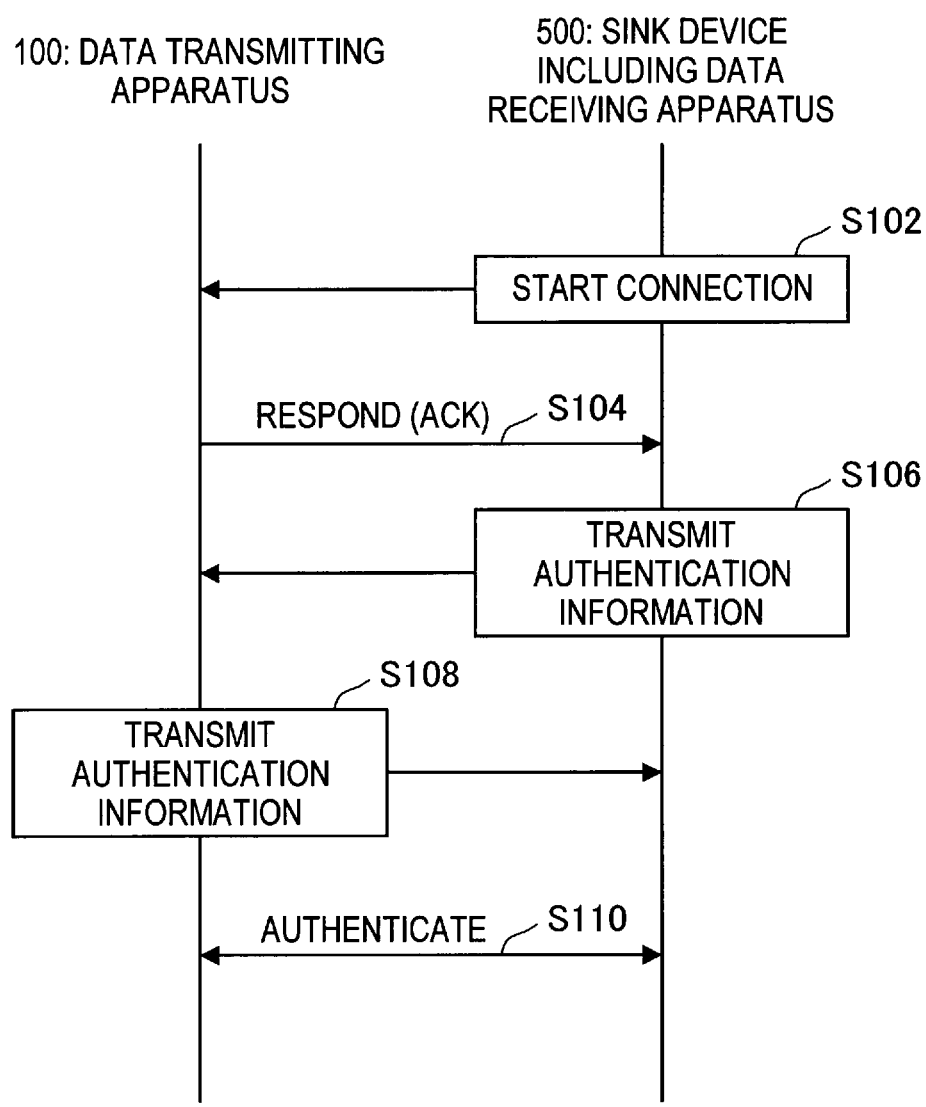
FIG. 6 is a timing chart showing a connection process by wireless communication, according to the first embodiment.

First, a connection process by wireless communication performed in the data transmitting and receiving system 2 will be described with reference to FIG. 6. FIG. 6 is a timing chart showing a connection process by wireless communication performed in the data transmitting and receiving system 2. As shown in FIG. 6, a connection process by wireless communication is performed between the data transmitting apparatus 100 and the sink device 500 including a data receiving apparatus. First, the sink device 500 including a data receiving apparatus notifies the data transmitting apparatus 100 of start of a connection by wireless communication (S102). The data transmitting apparatus 100 having been notified by the sink device 500 of the start of a connection at step S102 responds (ACK) to the start of a connection (S104).

The sink device 500 including a data receiving apparatus that has received a response to the start of a connection from the data transmitting apparatus 100 at step S104 transmits authentication information of the sink device 500 including a data receiving apparatus (S106). The data transmitting apparatus 100 to which the authentication information has been transmitted from the sink device 500 including a data receiving apparatus at step S106 transmits authentication information of the data transmitting apparatus 100 (S108). The authentication information of the devices transmitted and received at steps S106 and S108 are, for example, identification information of the devices or information calculated based on the identification information of the devices.

Then, based on the authentication information of the devices at steps S106 and S108, authentication between the data transmitting apparatus 100 and the sink device 500 including a data receiving apparatus is performed (S110). This is all about a connection process by wireless communication performed in the data transmitting and receiving system 2. When the authentication between the data transmitting apparatus 100 and the sink device 500 including a data receiving apparatus succeeds at step S110, an HDCP authentication process (S200) is performed. This is all about a connection process by wireless communication performed in the data transmitting and receiving system 2.

Figure 7:
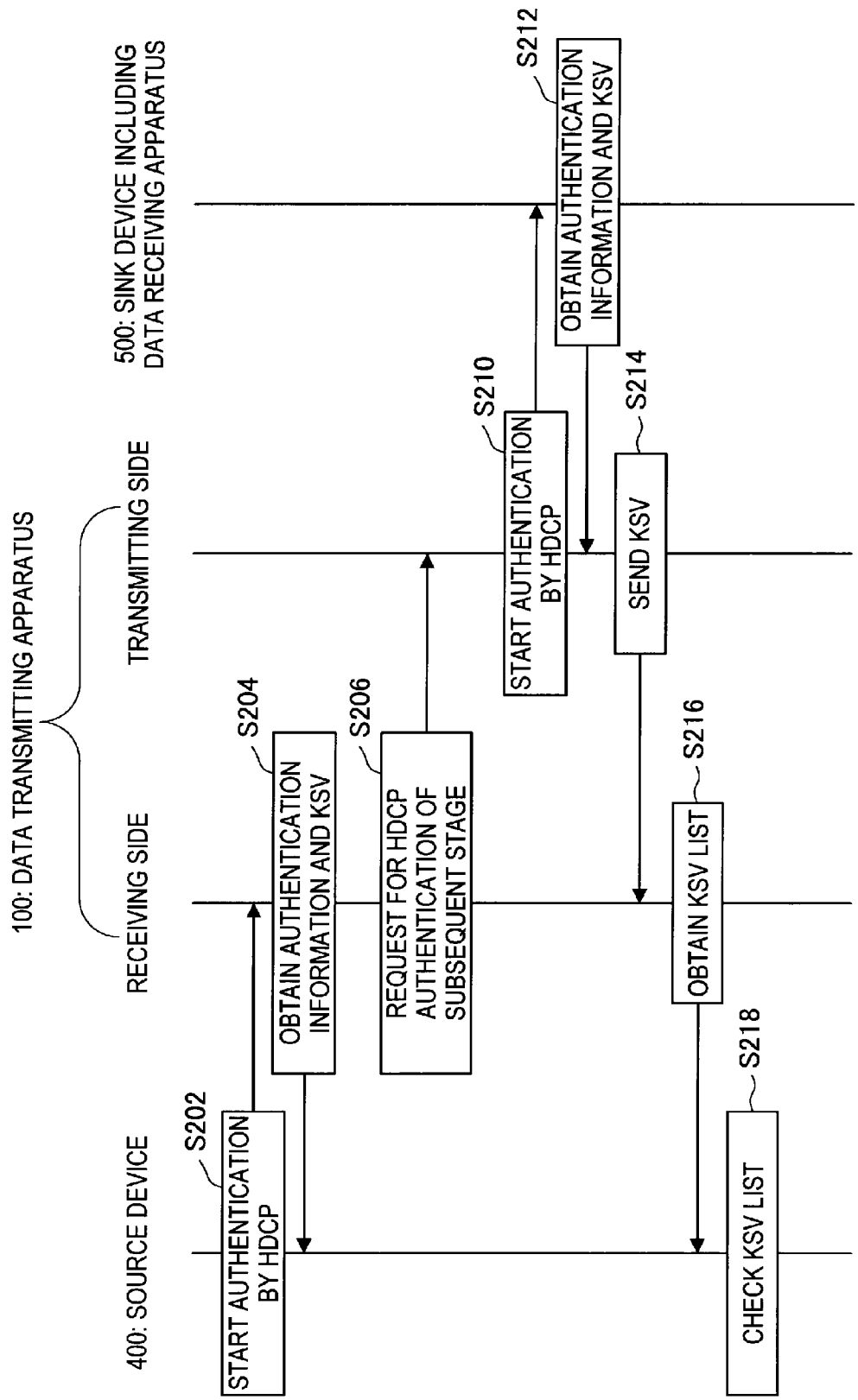
FIG. 7 is a timing chart showing an HDCP authentication process according to the first embodiment.

Next, an HDCP authentication process performed in the data transmitting and receiving system 2 will be described with reference to FIG. 7. FIG. 7 is a timing chart showing an HDCP authentication process performed in the data transmitting and receiving system 2. As shown in FIG. 7, the source device 400 notifies the receiving side of the data transmitting apparatus 100 of start of HDCP authentication (S202). Before the start of authentication is notified at step S202, a Hot Plug Detect request is sent to the source device 400 from the sink device 500 through the data transmitting apparatus 100. The source device 400 having notified of the start of HDCP authentication at step S202 obtains authentication information and a KSV (S204).

Then, the receiving side of the data transmitting apparatus 100 requests the transmitting side of the data transmitting apparatus 100 for HDCP authentication of a subsequent stage (S206). The transmitting side of the data transmitting apparatus 100 having been requested by the receiving side of the data transmitting apparatus 100 for the authentication at step S206 notifies the sink device 500 of start of HDCP authentication (S210). The transmitting side of the data transmitting apparatus 100 having notified the sink device 500 of the start of authentication at step S210 obtains authentication information and a KSV of the sink device 500 (S212).

Then, the transmitting side of the data transmitting apparatus 100 sends the KSV to the receiving side of the data transmitting apparatus 100 (S214). The source device 400 then obtains a KSV list from the receiving side of the data transmitting apparatus 100 (S216). The KSV list is, as described above, a KSV list of unauthorized devices. The source device 400 then checks the KSV list (S218).

This is all about an HDCP authentication process performed in the data transmitting and receiving system 2. When at step S218 the source device 400 determines that a destination to which image information of content is to be transmitted is an authorized device, an image information transmission process (S300) is performed.

Figure 8:
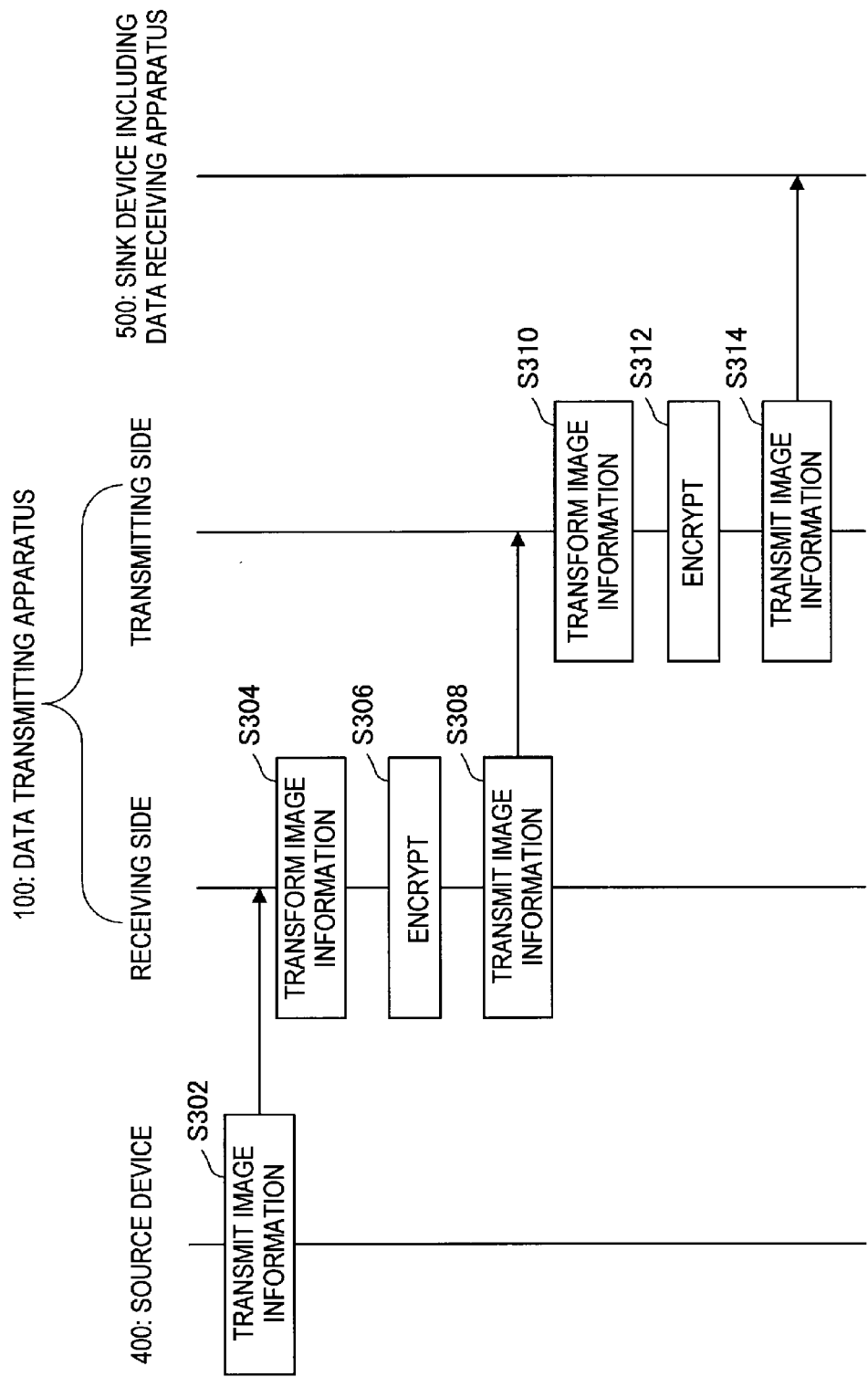
FIG. 8 is a timing chart showing an image information transmission process according to the first embodiment.

Next, an image information transmission process performed in the data transmitting and receiving system 2 will be described with reference to FIG. 8. FIG. 8 is a timing chart showing an image information transmission process performed in the data transmitting and receiving system 2. As shown in FIG. 8, the source device 400 transmits encrypted image information to the receiving side of the data transmitting apparatus 100 which is determined to be an authorized device at step S218 (S302). The receiving side of the data transmitting apparatus 100 to which the image information has been transmitted from the source device 400 at step S302 performs an image information transform, such as a DCT/Wavelet transform, on the image information (S304). The receiving side of the data transmitting apparatus 100 then encrypts the image information transformed at step S304, to transmit the image information by wireless communication (S306). The receiving side of the data transmitting apparatus 100 sends the image information encrypted at step S306 to the transmitting side of the data transmitting apparatus 100 (S308).

The transmitting side of the data transmitting apparatus 100 to which the image information has been transmitted from the receiving side of the data transmitting apparatus 100 by wireless communication at step S308 performs an image information transform such as DCT/Wavelet transform (S310). The transmitting side of the data transmitting apparatus 100 then encrypts the image information transformed at step S310, to transmit the image information by wireless communication (S312). The transmitting side of the data transmitting apparatus 100 transmits the image information encrypted at step S312 to the sink device 500 (S314). When the data transmitting apparatus 100 is connected to the sink device 500 by wire, the image information transmitted at step S308 is encrypted based on the HDCP standard and thereafter the encrypted image information is TMDS-converted. Thereafter, the TMDS-converted image information is transmitted to the sink device 500 via a TMDS signal path. This is all about an image information transmission process performed in the data transmitting and receiving system 2.

This is all about the data transmitting and receiving system 2 according to the first embodiment. According to the data transmitting and receiving system 2, when the data transmitting apparatus 100 and the sink device 500 are connected to each other by wireless communication, image information of content output from the source device 400 is encrypted for transmission by wireless communication, with the validity of the sink device 500 being confirmed by an HDCP revocation process. Then, the encrypted image information is transmitted to the sink device 500 which is wirelessly connected to the data transmitting apparatus 100.

In the present embodiment, since the data transmitting apparatus 100 is provided with a wire output, an HDCP revocation process can also be performed on the data receiving apparatus 500 which is connected to the data transmitting apparatus 100 by wireless communication. Likewise, since the sink device 500 is provided with a wire input, an HDCP revocation process can also be performed on the sink device 500. Consequently, even in wireless communication, mutual authentication between devices can be performed and a transmitting device and a receiving device can be arbitrarily combined. That is, even when HDCP security information is not stored in a receiving apparatus or a sink device, transmission and reception of content data can be performed with any device other than a specific transmitting apparatus, with the copyright of the content data being protected.

Second Embodiment

A second embodiment describes the data transmitting and receiving system 1 shown in FIG. 1a. In the data transmitting and receiving system 1, the data transmitting apparatus 100 and the data receiving apparatus 200 can be connected to each other by wireless communication or wire communication. The data transmitting apparatus 100 is connected by wire to the source device 400 and image information of content is input to the data transmitting apparatus 100. The data receiving apparatus 200 is connected to the sink device 300 wirelessly or by wire and image information of content is input to the sink device 300 from the data receiving apparatus 200.

In the present embodiment, also, since the source device 400 makes a revocation determination, KSVs of the data receiving apparatus 200 connected to the data transmitting apparatus 100 and the sink device 300 are transmitted to the source device 400 through the data transmitting apparatus 100.

Figure 9:
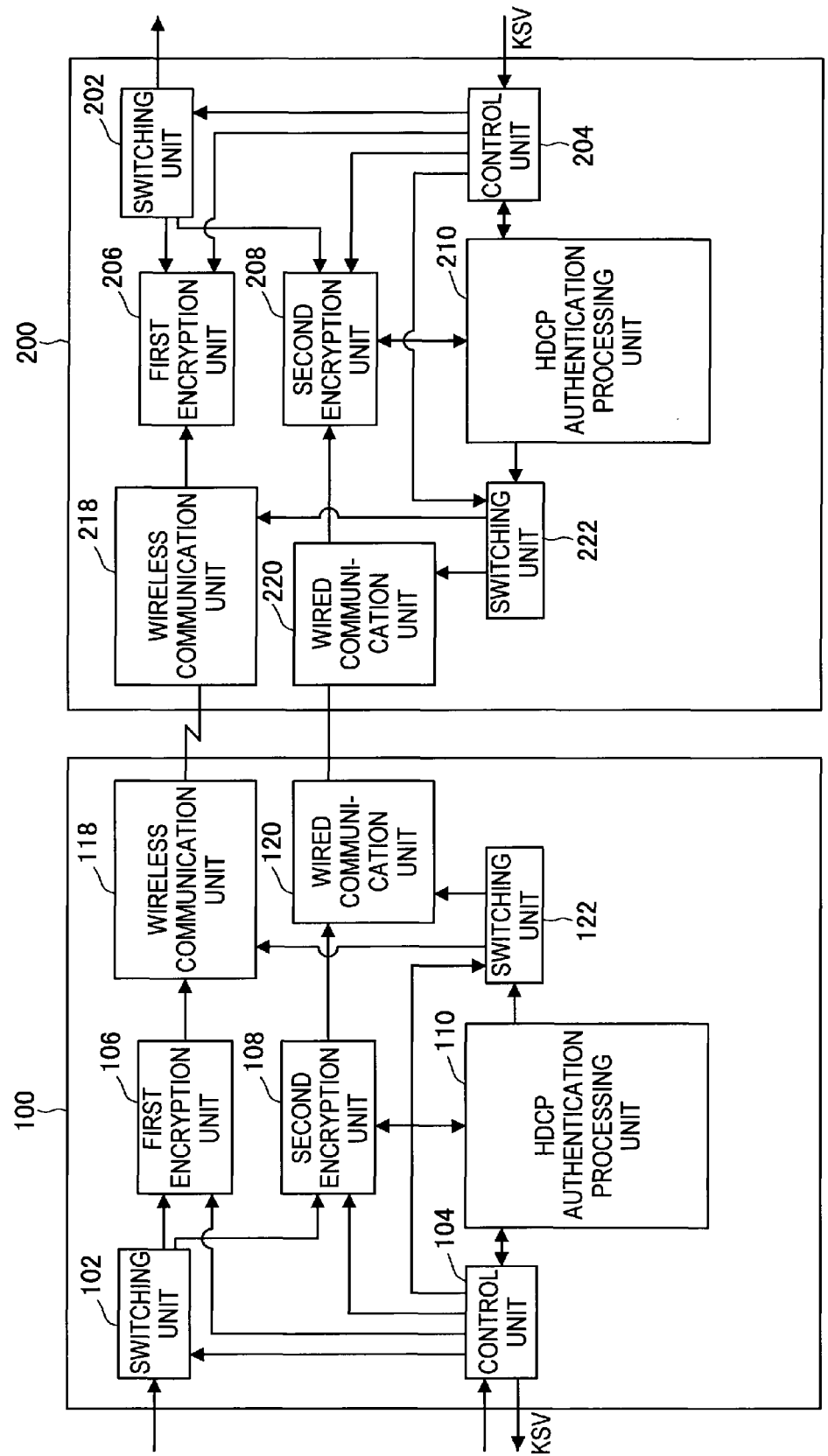
FIG. 9 is a block diagram showing the functional configurations of a data transmitting apparatus and a data receiving apparatus according to a second embodiment of the present invention.

As shown in FIG. 9, the data transmitting apparatus 100 includes a switching unit 102, a control unit 104, a first encryption unit 106, a second encryption unit 108, an HDCP authentication processing unit 110, a wireless communication unit 118, a wire communication unit 120, and a switching unit 122. The data receiving apparatus 200 includes a switching unit 202, a control unit 204, a first encryption unit 206, a second encryption unit 208, an HDCP authentication processing unit 210, a device information obtaining unit 212, a verification unit 214, a wireless communication unit 218, a wire communication unit 220, and a switching unit 222.

The first encryption unit 106 has a function of encrypting image information of input content with a first encryption scheme. The first encryption scheme is used when content data (image information) is transmitted by wireless communication, and is ensured with an encryption strength equal to that for the above-described TMDS. Alternatively, the first encryption unit 106 may compress image information of input content according to the image information and thereafter encrypt the compressed image information with the first encryption scheme. For compression of image information, for example, a DCT/Wavelet transform (time-frequency component transform) can be used.

The second encryption unit 108 has a function of encrypting image information of input content with a second encryption scheme. The second encryption scheme performs encryption based on the HDCP standard, specifically, encryption using a shared key which is shared only between those devices that are directly connected to each other in the course of an authentication process. Also, the second encryption unit 108 may TMDS-convert the encrypted image information of content. Furthermore, the second encryption unit 108 may perform a process in synchronization with an authentication process by the HDCP authentication processing unit 110. Specifically, after authentication by the HDCP authentication processing unit 110 succeeds, encryption with the second encryption scheme is performed.

The wireless communication unit 118 is a communication interface such as a wireless LAN compatible communication apparatus or a wireless USB compatible communication apparatus. The wireless communication unit 118 has a function of transmitting, by wireless communication, image information encrypted by the first encryption unit 106.

The wire communication unit 120 is a communication interface such as a wire communication apparatus which performs communication by wire. An example of the wire communication unit 120 includes a wire connection unit that complies with the HDMI standard. The wire communication unit 120 has a function of transmitting, by wire communication, image information encrypted by the second encryption unit 108.

The HDCP authentication processing unit 110 has a function of obtaining device information of a device connected to the data transmitting apparatus 100. The device information is, as described above, a KSV which is uniquely set according to a secret key of each device. KSVs are information obtained from a sink device to which image information is to be transmitted, etc.

The control unit 104 has a function of performing control as to whether to transmit and receive data using the wireless communication unit 118 or transmit and receive data using the wire communication unit 120, by controlling switching of the switching unit 102 or the switching unit 122. Specifically, when wireless communication is performed with the data receiving apparatus 200 by switching the switching unit 122, device information to be obtained by a device information obtaining unit 112 is obtained through the wireless communication unit 118. When wire communication is performed with the data receiving apparatus 200, the switching unit 122 is switched to obtain the device information through the wire communication unit 120.

This is all about the functional configuration of the data transmitting apparatus 100. Next, the functional configuration of the data receiving apparatus 200 will be described. The wireless communication unit 218 is a communication interface such as a wireless LAN compatible communication apparatus or a wireless USB compatible communication apparatus. The wireless communication unit 218 has a function of receiving image information of content transmitted from the data transmitting apparatus 100 by wireless communication.

The wire communication unit 220 is a communication interface such as a wire communication apparatus which performs communication by wire. An example of the wire communication unit 220 includes a wire connection unit that complies with the HDMI standard. The wire communication unit 220 has a function of receiving image information of content transmitted from the data transmitting apparatus 100 by wire communication.

The first encryption unit 206 has a function of encrypting image information of content received by the wireless communication unit 218, with a first encryption scheme. The first encryption scheme is used when content data (image information) is transmitted by wireless communication, and is ensured with an encryption strength equal to that for the above-described TMDS. Alternatively, the first encryption unit 206 may compress image information of input content according to the image information and thereafter encrypt the compressed image information with the first encryption scheme. For compression of image information, for example, a DCT/Wavelet transform (time-frequency component transform) can be used.

The second encryption unit 208 has a function of encrypting image information of content received by the wire communication unit 220, with a second encryption scheme. The second encryption scheme performs encryption based on the HDCP standard, specifically, encryption using a shared key which is shared only between those devices that are directly connected to each other in the course of an authentication process. Also, the second encryption unit 208 may TMDS-convert the encrypted image information of content. Furthermore, the second encryption unit 208 may perform a process in synchronization with an authentication process by the HDCP authentication processing unit 210. Specifically, after authentication by the HDCP authentication processing unit 210 succeeds, encryption with the second encryption scheme is performed.

The HDCP authentication processing unit 210 performs the above-described device authentication based on the HDCP standard. The HDCP authentication processing unit 210 has a function of obtaining device information of a device connected to the data receiving apparatus 200. The device information is, as described above, a KSV which is uniquely set according to a secret key of each device. KSVs are information obtained from a sink device to which image information is to be transmitted, etc.

The control unit 204 has a function of performing control as to whether to transmit and receive data using the wireless communication unit 218 or transmit and receive data using the wire communication unit 220, by controlling switching of the switching unit 202 or the switching unit 222. Specifically, when wireless communication is performed with the data transmitting apparatus 100 by switching the switching unit 222, device information to be obtained by the device information obtaining unit 212 is obtained through the wireless communication unit 218. When wire communication is performed with the data transmitting apparatus 100, the switching unit 222 is switched to obtain the device information through the wire communication unit 220. This is all about the functional configuration of the data receiving apparatus 200.

A connection process by wireless communication, an HDCP authentication process, and an image information transmission process according to the second embodiment are substantially the same as a connection process by wireless communication (S100), an HDCP authentication process (S200), and an image information transmission process (S300) according to the first embodiment and thus a detailed description thereof is omitted.

In the second embodiment, authentication by wireless communication is performed between the transmitting side of the data transmitting apparatus 100 and the receiving side of the data receiving apparatus 200. Then, a request for HDCP authentication of a subsequent stage is provided to the sink device 300 from the data transmitting apparatus 100 through the data receiving apparatus 200. Thereafter, authentication information and a KSV of the sink device 300 are sent to the data transmitting apparatus 100 through the data receiving apparatus 200. The transmitting side of the data transmitting apparatus 100 obtains a KSV list and transmits the KSV list to the source device 400. The source device 400 then checks the KSV list.

It should be understood by those skilled in the art that various modifications, combinations, sub-combinations and alterations may occur depending on design requirements and other factors insofar as they are within the scope of the appended claims or the equivalents thereof.

Although, in the above-described embodiments, a switching unit is provided to switch between encryption with the first encryption scheme and encryption with the second encryption scheme, the present invention is not limited thereto. For example, encryption may be performed with both the first encryption scheme and the second encryption scheme and the output of encrypted image information of content may be controlled. Alternatively, signal output from a TMDS circuit and signal output from a wireless transmitter-receiver may be controlled.

What is claimed is:

1. A data transmitting apparatus comprising:
    a first encryption unit that encrypts image information of input content with a first encryption scheme;
    a wireless communication unit that transmits, by wireless communication, the image information encrypted by the first encryption unit;
    a second encryption unit that encrypts image information of input content with a second encryption scheme;
    a wire communication unit that transmits, by wire communication, the image information encrypted by the second encryption unit;
    a device information obtaining unit that obtains device information of a connected device;
    an authentication unit that authenticates validity of the data receiving apparatus, based on the device information obtained by the device information obtaining unit; and
    a control unit that performs control as to obtain the device information through the wireless communication unit, and transmit the image information encrypted by the first encryption unit from the wireless communication unit when the validity of the data receiving apparatus is authenticated by the authentication unit,
    and as to obtain the device information through the wire communication unit, and transmit the image information encrypted by the second encryption unit from the wire communication unit when the validity of the data receiving apparatus is authenticated by the authentication unit,
    wherein transmission of the image information via wireless communication is conditioned on authentication of the receiving device using wire-input security information to conduct a High-bandwidth Digital Content Protection system (HDCP) revocation process, and wherein the control unit performs control as to transmit the image information from the wireless communication unit or the wire communication unit, such that when the image information is transmitted from the wireless communication unit the image information is transmitted as encrypted according to the first encryption scheme, and when the image information is transmitted from the wire communication unit the image information is transmitted as encrypted according to the second encryption scheme.

2. The data transmitting apparatus according to claim 1, wherein the control unit notifies the data receiving apparatus of start of authentication based on HDCP specification.

3. The data transmitting apparatus according to claim 1, wherein:

the device information obtaining unit obtains information on unauthorized devices from an external apparatus, and when the device information of the data receiving apparatus is not included in the information on unauthorized devices obtained by the device information obtaining unit, the authentication unit determines that the data receiving apparatus is an authorized device.

4. The data transmitting apparatus according to claim 1, wherein the first encryption unit compresses the image information according to the image information of the content and thereafter encrypts the compressed image information with the first encryption scheme.

5. A data receiving apparatus comprising:

a wireless communication unit that receives image information of content by wireless communication from a data transmitting apparatus that is connected;

a first decryption unit that decrypts the received image information of content with a first decryption scheme;

a wire communication unit that receives image information of content from the data transmitting apparatus that is connected, by wire communication;

a second decryption unit that decrypts the received image information of content with a second decryption scheme;

a device information obtaining unit that obtains device information of a connected device;

an authentication unit that authenticates validity of the connected device, based on the device information obtained by the device information obtaining unit; and a control unit that performs control as to obtain the device information through the wireless communication unit, and when the validity of the connected device is authenticated by the authentication unit, receive the image information by the wireless communication unit and decrypts the image information by the first decryption unit, and as to obtain the device information through the wire communication unit, and when the validity of the connected device is authenticated by the authentication unit, receive the image information by the wire communication unit and decrypts the image information by the second decryption unit, wherein reception of the image information via wireless communication is conditioned on authentication of the connected device using wire-input security information to conduct a High-bandwidth Digital Content Protection system (HDCP) revocation process, and wherein the control unit performs control as to receive the image information by the wireless communication unit or the wire communication unit, such that when the image information is received by the wireless communication unit the image information is decrypted according to the first decryption scheme, and when the image information is received by the wire communication unit the image information is decrypted according to the second decryption scheme.

6. The data transmitting apparatus according to claim 5, wherein the control unit notifies the connected device of start of authentication based on HDCP specification.

7. The data receiving apparatus according to claim 5, wherein:

the device information obtaining unit obtains information on unauthorized devices from an external apparatus, and when the device information of the connected device is not included in the information on unauthorized devices obtained by the device information obtaining unit, the authentication unit determines that the connected device is an authorized device.

8. The data receiving apparatus according to claim 5, wherein the first decryption unit compresses the image information according to the image information of content and thereafter decrypts the compressed image information with the first decryption scheme.

9. A data receiving apparatus comprising:

a wireless communication unit that receives image information of content by wireless communication from a data transmitting apparatus that is connected;

a first decryption unit that decrypts the received image information of content with a first decryption scheme;

a wire communication unit that receives image information of content from the data transmitting apparatus that is connected, by wire communication;

a second decryption unit that decrypts the received image information of content with a second decryption scheme;

a device information transmitting unit that transmits device information of the data receiving apparatus;

an authentication result obtaining unit that obtains authentication result of validity of the data receiving apparatus which is authenticated by the data transmitting apparatus, based on the device information transmitted from the device information transmitting unit;

a control unit that performs control as to transmit the device information through the wireless communication unit, and when the authentication result that the receiving device is authenticated is obtained by the authentication result obtaining unit, receive the image information by the wireless communication unit and decrypt the image information by the first decryption unit, and as to transmit the device information through the wire communication unit, and when the authentication result that the receiving device is authenticated is obtained by the authentication result obtaining unit, receive the image information by the wire communication unit and decrypt the image information by the second decryption unit; and a display screen generating unit that generates a display screen containing the image information decrypted by the first decryption unit or the second decryption unit, wherein transmission of the image information via wireless communication is conditioned on authentication of the receiving device using wire-input security information to conduct a High-bandwidth Digital Content Protection system (HDCP) revocation process, and wherein the control unit performs control as to receive the image information by the wireless communication unit or the wire communication unit, such that when the image information is received by the wireless communication unit the image information is decrypted according to the first decryption scheme, and when the image information is received by the wire communication unit the image information is decrypted according to the second decryption scheme.

10. The data receiving apparatus according to claim 9, wherein:
the display screen generating unit is included in a display apparatus which is built in the data receiving apparatus,
the device information transmitting unit transmits device information of the display apparatus, and
the verification result obtaining unit obtains a verification result of validity of the data receiving apparatus which is verified by the data transmitting apparatus, based on the device information of the display apparatus.

11. The data receiving apparatus according to claim 9, the first decryption scheme is a decryption scheme used when image information of content is transmitted by wireless communication.

12. A data transmitting method comprising the steps of:
encrypting image information of input content with a first encryption scheme;
encrypting image information of input content with a second encryption scheme;
determining whether to obtain device information of a connected device through a wireless communication unit that receives image information of content by wireless communication or obtain the device information through a wire communication unit that receives image information of content by wire communication, and obtaining the device information of the connected device;
authenticating validity of a data receiving apparatus, based on the obtained device information;
performing control as to obtain the device information through the wireless communication unit, and transmit the image information encrypted by the first encryption unit from the wireless communication unit when the validity of the data receiving apparatus is authenticated, and
performing control as to obtain the device information through the wire communication unit, and transmit the image information encrypted by the second encryption unit from the wire communication unit when the validity of the data receiving apparatus is authenticated in the step of authenticating validity,
wherein transmission of the image information via wireless communication is conditioned on authentication of the receiving apparatus using wire-input security information to conduct a High-bandwidth Digital Content Protection system (HDCP) revocation process, and
wherein the steps of performing control comprise performing control as to transmit the image information from the wireless communication unit or the wire communication unit, such that when the image information is transmitted from the wireless communication unit the image information is transmitted as encrypted according to the first encryption scheme, and when the image information is transmitted from the wire communication unit the image information is transmitted as encrypted according to the second encryption scheme.

13. A data receiving method comprising the steps of:
decrypting image information of content received from a data transmitting apparatus, with a first decryption scheme;
decrypting image information of content received from the data transmitting apparatus, with a second decryption scheme;
performing control as to whether to obtain device information of a connected device through a wireless communication unit that receives image information of content by wireless communication or obtain the device information through a wire communication unit that receives image information of content by wire communication;
obtaining the device information of the connected device;
authenticating validity of the connected device, based on the obtained device information;
performing control as to obtain the device information through the wireless communication unit, and when the validity of the connected device is authenticated by the authentication unit, receive the image information by the wireless communication unit and decrypts the image information by the first decryption unit; and
performing control as to obtain the device information through the wire communication unit, and when the validity of the connected device is authenticated by the authentication unit, receive the image information by the wire communication unit and decrypts the image information by the second decryption unit,
wherein reception of the image information via wireless communication is conditioned on authentication of the connected device using wire-input security information to conduct a High-bandwidth Digital Content Protection system (HDCP) revocation process, and
wherein the steps of performing control comprise performing control as to receive the image information by the wireless communication unit or the wire communication unit, such that when the image information is received by the wireless communication unit the image information is decrypted according to the first decryption scheme, and when the image information is received by the wire communication unit the image information is decrypted according to the second decryption scheme.

14. A data receiving method comprising the steps of:
decrypting image information of content received from a data transmitting apparatus, with a first decryption scheme;
decrypting image information of content received from the data transmitting apparatus, with a second decryption scheme;
performing control as to whether to transmit device information of a data receiving apparatus through a wireless communication unit that receives image information of content by wireless communication or transmit the device information through a wire communication unit that receives image information of content by wire communication;
transmitting the device information;
obtaining authentication result of validity of the data receiving apparatus which is authenticated by the data transmitting apparatus, based on the transmitted device information;
performing control as to transmit the device information through the wireless communication unit, and when the authentication result that the receiving device is authenticated is obtained in the step of obtaining authentication result, receive the image information by the wireless communication unit and decrypt the image information by the first decryption unit; and
performing control as to transmit the device information through the wire communication unit, and when the authentication result that the receiving device is authenticated is obtained in the step of obtaining authentication result, receive the image information by the wire communication unit and decrypt the image information by the second decryption unit; and
generating a display screen containing the image information decrypted with the first decryption scheme or the second decryption scheme,
wherein reception of the image information via wireless communication is conditioned on authentication of the receiving apparatus using wire-input security information to conduct a High-bandwidth Digital Content Protection system (HDCP) revocation process, and
wherein the steps of performing control comprise performing control as to receive the image information by the wireless communication unit or the wire communication unit, such that when the image information is received by the wireless communication unit the image information is decrypted according to the first decryption scheme, and when the image information is received by the wire communication unit the image information is decrypted according to the second decryption scheme.

* * * * *